United States Patent [19]

Sullivan et al.

[11] Patent Number: 5,001,386

[45] Date of Patent: Mar. 19, 1991

[54] CIRCUIT FOR DIMMING GAS DISCHARGE LAMPS WITHOUT INTRODUCING STRIATIONS

[75] Inventors: Charles R. Sullivan, Coopersburg; Scott R. Jurell, Hellertown; David G. Luchaco, Macungie, all of Pa.

[73] Assignee: Lutron Electronics Co., Inc., Coopersburg, Pa.

[21] Appl. No.: 455,644

[22] Filed: Dec. 22, 1989

[51] Int. Cl.$^5$ .................. H05B 41/29; H05B 41/392
[52] U.S. Cl. ................... 315/219; 315/166; 315/171; 315/307; 315/DIG. 4
[58] Field of Search ............ 315/166, 171, 176, 219, 315/307, DIG.4, DIG.5, DIG.7

[56] References Cited

U.S. PATENT DOCUMENTS

| | | | |
|---|---|---|---|
| 3,619,716 | 11/1971 | Spira et al. | 315/244 |
| 3,731,142 | 5/1973 | Spira et al. | 315/94 |
| 4,350,935 | 9/1982 | Spira et al. | 315/291 |
| 4,651,060 | 3/1987 | Clark | 315/199 |
| 4,663,569 | 5/1987 | Alley et al. | 315/175 |
| 4,663,570 | 5/1987 | Luchaco et al. | 315/219 |
| 4,682,082 | 7/1987 | MacAskill et al. | 315/219 |
| 4,745,342 | 5/1988 | Andreson et al. | 315/200 R |
| 4,792,727 | 12/1988 | Godyak | 315/171 |
| 4,853,598 | 8/1989 | Kusko et al. | 315/101 |
| 4,862,042 | 8/1989 | Herrick | 315/174 X |
| 4,870,326 | 9/1989 | Andresen et al. | 315/200 R |
| 4,916,362 | 4/1990 | Orenstein | 315/223 X |

OTHER PUBLICATIONS

May & Chrsite GMBH Transformaternwerke brochure.
Welding Power handbook, Union Carbide, Manz, A.F., pp. 100–109, 9-1981.
Cherry/Gas Plasma Displays brochure, No. CE-023.
Luciano DiFraia, "A Method to Achieve Continuous Dimming of Low Pressure Sodium and Other Gas Discharge Lamps", *Journal of IES (Jul. 1981)*, pp. 245–252.

Primary Examiner—David Mis

[57] ABSTRACT

A dimming circuit provides power from an ac source to a compact fluorescent lamp. The circuit generally includes a resonant circuit driven by a high-frequency switching inverter. The resonant circuit is essentially an ac current source and provides sinusoidal current to the lamp, which loads the resonant circuit in parallel. A small amount of dc current is simutaneously provided to the lamp. The resultant asymmetric current waveform flowing through the lamp substantially eliminates striation over a dimming range from about 100% to 1% of full light output.

23 Claims, 3 Drawing Sheets

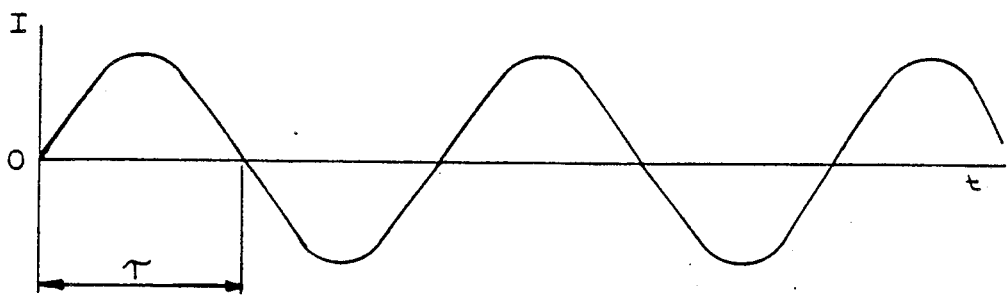
FIG. 2A. AC COMPONENT
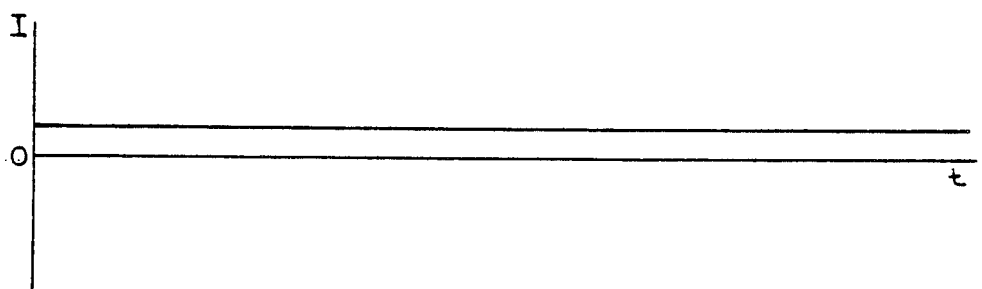
FIG. 2B. DC COMPONENT
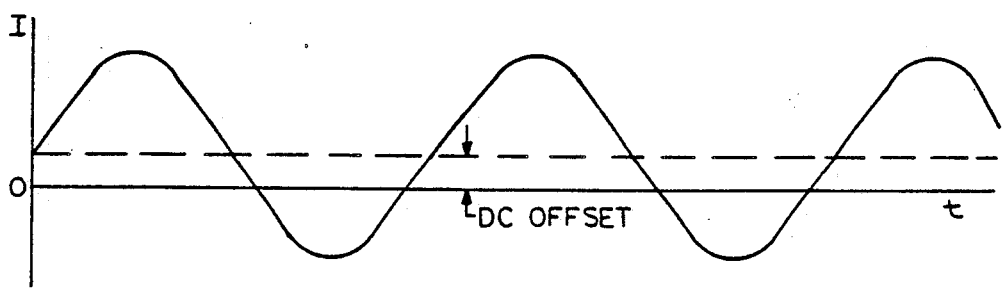
FIG. 2C. RESULTANT AC + DC

CIRCUIT FOR DIMMING GAS DISCHARGE LAMPS WITHOUT INTRODUCING STRIATIONS

BACKGROUND OF THE INVENTION

1. Field of the Invention

This invention pertains to dimming gas discharge lamps and, more particularly, to dimming compact fluorescent lamps.

2. Description of the Related Art

A gas discharge lamp converts electrical energy into visible energy with high efficiency. A gas discharge lamp is generally an elongated gas-filled (usually low pressure mercury vapor) tube having electrodes at each end. Each electrode is formed from a resistive filament (usually tungsten) coated with a thermionically emissive material, such as a mixture of alkaline earth oxides.

The steady-state operation of a gas discharge lamp is as follows: Voltage is applied across the resistive filaments, heating the electrodes to a temperature sufficient to cause thermionic emission of electrons into the discharge tube. A voltage applied between the electrodes accelerates the electrons toward the anode. En route to the anode, the electrons collide with gas atoms to produce positive ions and additional electrons, forming in the tube a gas plasma of positive and negative charge carriers. The electrons continue to stream toward the anode and the positive ions toward the cathode, sustaining an electric discharge in the tube and further heating the electrodes. (If the applied power is ac, the electrodes reverse polarity during each half cycle.)

The discharge causes the emission of radiation having a wavelength dependent upon the particular fill gas and the electrical parameters of the discharge. Because each collision produces additional electrons and ions, increases in the arc current cause the impedance of the lamp to decrease, a characteristic known as "negative resistance." Operation of the lamp is inherently unstable, due to this negative resistance characteristic, and current between the electrodes must be limited to avoid damaging the lamp.

Dimming of gas discharge lamps is well known. A circuit for dimming a fluorescent gas discharge lamp is disclosed in U.S. Pat. No. 3,927,345, issued Dec. 16, 1975, to Licata et al., incorporated herein by reference. A fluorescent lamp is a gas discharge lamp in which the inner surface of the tube is coated with a fluorescent phosphor. The phosphor is excited by ultraviolet radiation from the electric discharge and fluoresces, providing visible light. Licata discloses a phase control dimming circuit which provides phase controlled voltage from a 60 Hz ac source to a fluorescent lamp in series with an inductive ballast. The dimming circuit employs a bi-directional triode-type thyristor (triac) as the main switching device and includes a dc compensation circuit to ensure symmetrical triac firing delays in each half cycle of power flow from the ac source. There is no current through the lamp during the triac firing delay. Symmetrically firing the triac prevents an excessive amount of dc current from flowing through the lamp, which can cause lamp flickering and saturation of the inductive ballast. The circuit operates over a dimming range from about 100% to 50% of full light output. Below about 50% light output, the electric discharge cannot be sustained, because the triac firing delay is longer than the recombination time of the gas plasma in the discharge tube.

U.S. Pat. No. 4,001,637, issued Jan. 4, 1977, to Gray, discloses a gas discharge lamp dimming circuit that is capable of operating lamps at dimming levels below 50% of full light output. Low dimming levels are attained by providing uninterrupted filtered dc current to the lamp. The circuit includes a capacitive ballast, a full wave rectifier, and an output filter. Ac current flows from a phase controlled source through the capacitive ballast to a full-wave rectifier. Pulsating dc current is provided by the full-wave rectifier to an LC low pass filter and then to the lamp electrodes. However, dc current tends to cause anode oscillations, uneven illumination along the length of the lamp, and a reduction in useful lamp life.

Anode oscillations can be greatly reduced by operating a lamp at frequencies much higher than the fundamental frequency of the anode oscillation. U.S. Pat. No. 4,207,498, issued June 10, 1980, to Spira et al., discloses a dimming system that includes a central inverter for providing a 23 kHz ac current through the lamp. The lamp can be dimmed over a range from 100% to 1% of full light output by adjusting the amplitude of the inverter output. The use of high-frequency ac current also may increase the efficacy of the lamp by as much as 20%.

At low light levels (less than about 30% of full light output), however, the lamp tends to "striate"; i.e., to break up into alternating bands of bright and dim areas along the length of the tube. The mechanisms that cause striation are not completely understood, but it is believed to result from high-frequency currents reinforcing a standing wave of varying charge distribution between the lamp electrodes. For reasons that are not clear, small-diameter lamps and lamps with sharp bends (typical characteristics of compact fluorescent lamps) are more likely to striate.

SUMMARY OF THE INVENTION

The present invention provides a dimming circuit for compact fluorescent lamps which greatly reduces striation while maintaining a flicker-free dimming range from about 100% to 1% of full light output. The dimming circuit generally provides 27 kHz sinusoidal current to the lamp electrodes to initiate and maintain an electric discharge through the lamp and, simultaneously, provides a small amount of substantially non-pulsating dc current to the electrodes to produce an asymmetric current waveform through the lamp. The asymmetric current flow greatly reduces visible striations in the lamp. We believe that the asymmetry alters the charge distribution in the tube to prevent formation of a standing wave between the lamp electrodes. Although a wave-like variation in charge distribution can be measured along the discharge tube, it is not a standing wave; it moves with a velocity that is determined by the magnitude of the dc component of current flow through the lamp. Visible striations are eliminated by providing to the lamps a dc current that causes the bright and dim bands, produced by the wave-like charge distribution, to move rapidly, so they become imperceptible. Too much dc current, however, causes anode oscillations. A suitable amount of dc current is selected by compromising between the effects of striations and anode oscillations. It has been found experimentally that a dc current of about 0.04 to 1.4 mA satisfactorily achieves this compromise for a typical compact fluorescent lamp. Generally, the optimum dc current increases over the dimming range between minimum and mid range power. At higher powers, the precise value of dc current is less critical. The ratio of dc current in the low-to-mid range is preferably about 1:2. Thus, preferred dc currents are about 0.04 to 0.7 mA and about 0.1 to 1.4 mA at minimum and half-maximum lamp powers, respectively.

According to the present invention, a control system for providing electrical power from a source to a gas discharge lamp comprises:
 (a) means for providing symmetrical ac current to the electrodes of said lamp to strike and maintain an electric discharge therethrough; and
 (b) means for simultaneously providing dc current to said lamp electrodes;
whereby an asymmetric current waveform is established in the lamp, substantially eliminating the occurrence of visible striations.

In another embodiment of the present invention, a control system for providing electrical power from a source to a pair of gas discharge lamps connected in series comprises:
 (a) means for providing symmetrical ac current to the electrodes of said lamps to strike and maintain an electric discharge therethrough; and
 (b) means for simultaneously providing dc current to said lamp electrodes;
whereby an asymmetric current waveform is established in the lamps, substantially eliminating the occurrence of visible striations.

BRIEF DESCRIPTION OF THE DRAWINGS

FIGS. 2A, 2B, and 2C are graphs of current flow through a compact fluorescent lamp according to the present invention.

DETAILED DESCRIPTION OF THE PRESENT INVENTION

Figure 1:
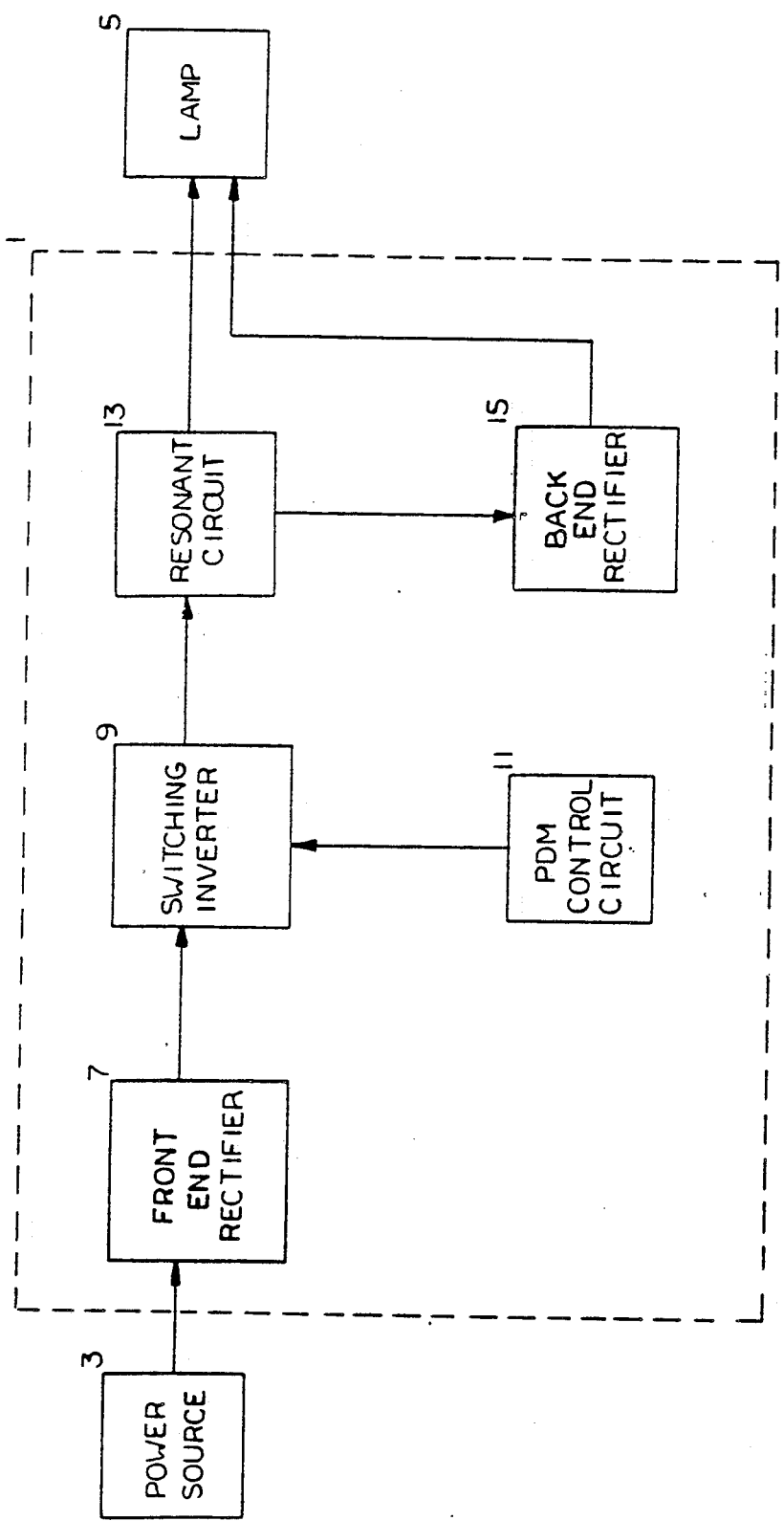
FIG. 1 is a block diagram of a dimming circuit of the present invention.

FIG. 1 shows a block diagram of the dimming circuit of the present invention. The dimming circuit 1, enclosed in the dashed lines, provides a variable amount of power from sinusoidal power source 3 to a gas discharge lamp 5. The dimming circuit generally includes a front-end rectifier 7 to convert a (typically) 60 Hz ac voltage from power source 3 into a dc voltage provided to switching inverter 9. Switching inverter 9 converts the dc voltage into a high-frequency ac voltage consisting of alternately inverted and non-inverted rectangular pulses of voltage having variable duration. Pulse duration modulation (PDM) circuit 11 provides a modulating voltage waveform to switching inverter 9 to control the duration of each pulse.

The high-frequency ac voltage from switching inverter 9 drives resonant circuit 13 so that it resonates substantially sinusoidally, with an amplitude determined by the amplitude and frequency of the driving voltage and the magnification factor Q of the resonant circuit. The resonant circuit is essentially a symmetrical high-frequency sinusoidal current source with a variable amplitude determined by the pulse duration of the driving voltage from switching inverter 9. In this specification and the appended claims, a resonant circuit is understood to have a single fundamental mode of resonance. The term "peak response frequency" refers to the frequency at which this fundamental resonance is maximized. As applied to ac waveforms, the term "symmetrical" is understood to mean that the positive portion of the waveform is substantially identical in shape and magnitude to the corresponding negative portion of the waveform.

The current from resonant circuit 13 is provided to lamp 5 to strike and maintain a stable electric discharge over a range of selectable power levels. Simultaneously, back-end rectifier 15 rectifies a predetermined amount of current from resonant circuit 13 and provides it to lamp 5, adding to the current flow therethrough a dc component selected to minimize striations and anode oscillations.

FIG. 2A shows the ac component of current flow through a compact fluorescent lamp according to the present invention. The half-period $\tau$ is determined by the frequency of the sinusoidal current and is preferably shorter than the recombination time of the gas plasma ($\sim 100$ $\mu$s) in order to sustain the electric discharge without flicker. The RMS value of ac current to the lamp substantially determines the power and, therefore, the brightness of the lamp and is preferably adjustable from about 1 to 200 mA.

FIG. 2B shows the dc component of current flow through the lamp. For illustrative purposes, the magnitude of the dc component is exaggerated with respect to the ac component. As a practical matter, at full lamp power, the dc component may range from about 0.02 to 0.35% of the ac component; at minimum lamp power, a dc component of about 5% to 50% of the resultant current is preferred.

FIG. 2C shows the total current waveform that flows through the lamp. The dc component offsets the ac component from the zero current level, causing a slightly asymmetric resultant current waveform that substantially reduces lamp striations.

Figure 3:
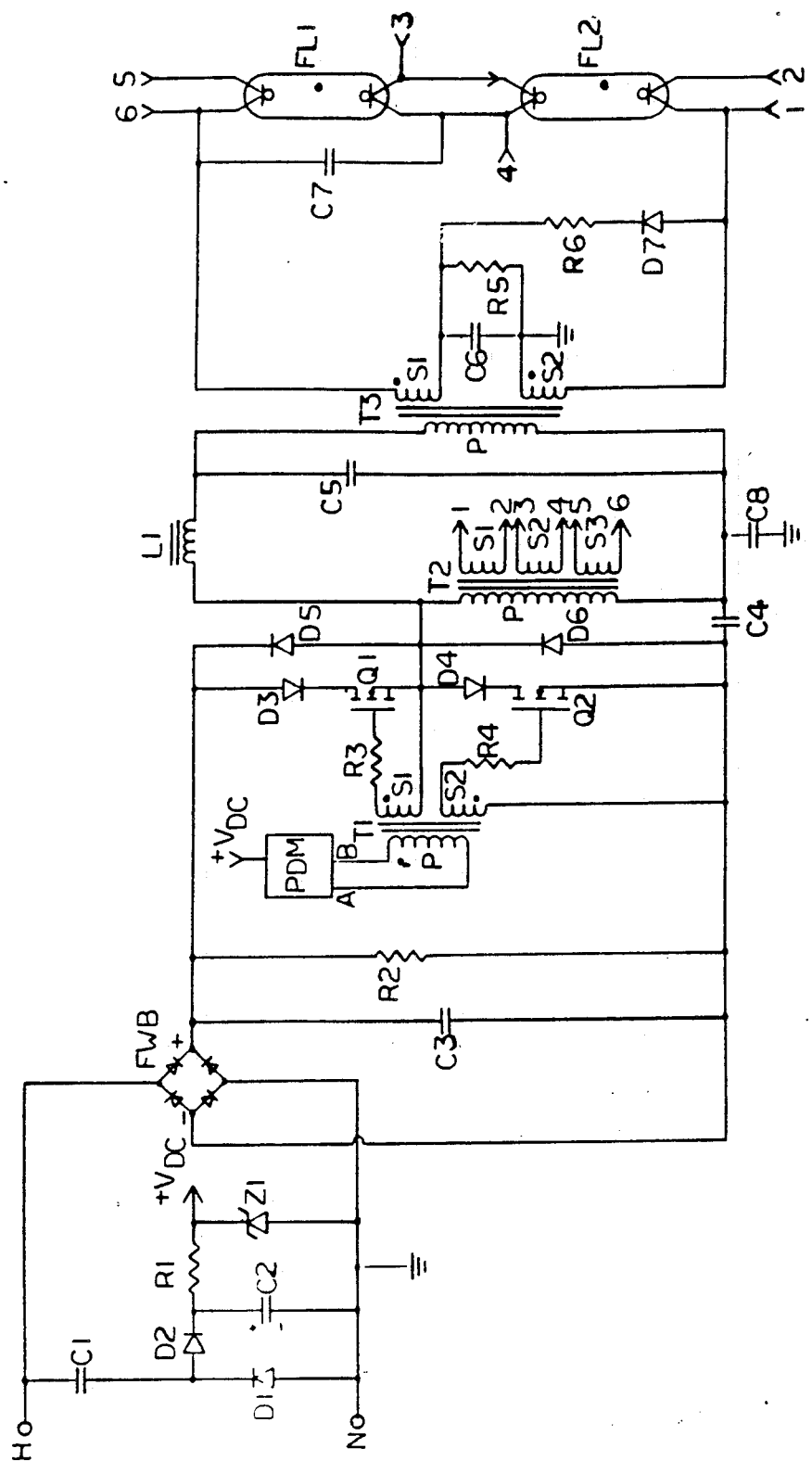
FIG. 3 is a circuit schematic of a dimming circuit of the present invention.

FIG. 3 is a circuit schematic of the dimming circuit of the present invention. The circuit operates as follows: ac voltage is provided from a power source across hot (H) to neutral (N). Diodes D1 and D2, resistor R1, capacitors C1 and C2, and zener diode Z1 comprise a low voltage dc power supply. During each positive voltage half-cycle, current flows from hot through capacitors C1 and C2, and diode D2 to neutral, charging capacitor C2 plus(+) to minus(−), as shown. Resistor R1 and zener diode Z1 regulate the voltage on capacitor C2 so that the power supply is essentially a dc voltage source having a dc supply voltage equal to the breakover voltage of zener diode Z1 and an internal resistance essentially equal to R1. Diode D1 provides a discharge path for capacitor C1 during each negative voltage half-cycle.

Full-wave-bridge FWB rectifies ac voltage from the power source and provides pulsating dc voltage across the output terminals (+) and (−). Pulsating dc is filtered by capacitor C3, which is connected across the output terminals of the full-wave-bridge. Resistor R2 is connected in parallel with C3 and bleeds charge from it when power is removed. For purposes of this specification and the appended claims, when referring to electrical elements, the term "connected" means that there exists between two or more elements a conductive path, which may include additional elements not explicitly recited.

Diodes D3, D4, D5, and D6, MOSFETS Q1 and Q2, resistors R3 and R4, transformer T1, and capacitor C4 comprise a switching inverter for switching and inverting filtered dc voltage into a high frequency ac driving voltage. During operation, capacitor C4 charges up to approximately half of the voltage across capacitor C3. When Q1 is conductive, a driving voltage is applied across the primary winding P of transformer T2 that is positive and equal to the voltage across C3 less the voltage across C4 (approximately half the voltage across C3). When Q2 is conductive, the driving voltage is inverted and equal to the voltage across C4. When Q1 and Q2 are alternately switched at a high frequency (~27 kHz), rectangular pulses of ac driving voltage are produced having a peak-to-peak voltage substantially equal to the voltage across capacitor C3.

The driving frequency is preferably between 20 kHz and 50 kHz and is determined by the ac control voltage from the PDM circuit, discussed below. Frequencies below 20 kHz are in the human audible range and are therefore undesirable. High frequencies (above 50 kHz) are undesirable because they tend to cause high thermal dissipation in MOSFETS Q1 and Q2 and they lower the capacitive impedance of the fixture wires to ground.

Resistors R3 and R4 damp oscillations which may otherwise occur due to the leakage inductance of secondary windings S1 and S2 of transformer T1 and gate capacitance of MOSFETS Q1 and Q2. Diodes D3 and D4 block reverse current from flowing through MOSFETS Q1 and Q2, respectively. Diodes D5 and D6 provide a commutation path for current flowing through Q2 and Q1, respectively.

Q1 and Q2 could be any type of semiconductor switch, such as FETS or bipolar transistors; however, MOSFETS, as shown, are preferred because of their fast switching ability and their relatively low gate current requirements. Alternatively, the switching inverter may be replaced with a less-expensive semiconductor dc frequency converter, which converts a non-pulsating dc voltage into a high-frequency pulsating dc voltage. An inverting type of oscillating circuit, which converts dc to ac, is preferred, however, since it provides reduced peak magnetic flux in the core of the power-carrying transformers for the same amount of transformed energy.

Pulse duration modulation circuit PDM receives voltage ($+V_{DC}$) from the dc power supply and provides an ac control voltage across the primary winding P of transformer T1 to control the conductivity of MOSFETS Q1 and Q2 and, accordingly, the duration of each rectangular pulse of driving voltage. Secondary windings S1 and S2 of transformer T1 are arranged so that voltage is applied to the gates of MOSFETS Q1 and Q2 in opposite polarities so that only one device may be conductive at any given time. Pulse-duration-modulated driving voltage is provided across primary P of transformer T2 and across the resonant circuit consisting of inductor L1 and capacitor C5 connected in series. The resonant circuit rings substantially sinusoidally at the driving frequency with an amplitude determined by the pulse duration of the driving voltage and the magnification factor Q of the resonant circuit. The magnification factor Q, in this case, is determined primarily by the impedance of lamps FL1 and FL2, which load the resonant circuit in parallel.

Loading the resonant circuit in parallel tends to stabilize operation of the gas discharge lamps. In particular, as current through the lamps increases, lamp impedance decreases, decreasing the magnification factor Q of the resonant circuit and, thereby, reducing its resonant response. Conversely, as the current through the lamps decreases, lamp impedance increases, increasing the magnification factor Q of the resonant circuit and, thereby, boosting its resonant response. The resonant circuit essentially behaves like an ac current source and provides high-frequency sinusoidal current through transformer T3 to lamps FL1 and FL2. The magnitude of the current is variable from about 1 to 200 mA RMS, depending upon the pulse duration of the driving voltage, and is sufficient to strike and maintain an electric discharge in the lamps.

To further increase the stability of the resonant circuit, the frequency of the driving voltage (~27 kHz) is less than the peak response frequency of the resonant circuit (~33 kHz). Alternatively, damping could be added to the resonant circuit, reducing the magnification factor Q; however, this would reduce its efficiency and generate unwanted heat.

Capacitor C6, resistors R5 and R6, and diode D7 form a back end rectifier circuit for providing dc current through lamps FL1 and FL2 in series. Capacitor C6, connected between secondary windings S1 and S2 of transformer T3, is selected to pass substantially all high-frequency sinusoidal current from the resonant circuit to lamps FLI and FL2. Resistor R6 allows dc current to flow through diode D7, providing a dc offset to capacitor C6 so that the sinusoidal current through C6 and lamps FL1 and FL2 receives a dc component of current, as determined by resistor R6. Resistor R5 is essentially a bleeder to discharge capacitor C6 when power is removed. Resistor R5 also limits the amount of dc offset on capacitor C6 when the impedance of the lamps increases (at low power levels).

Earth ground is referenced between secondary windings S1 and S2 of transformer T3. The relative sizes of the secondary windings are selected to provide sufficient voltage with respect to ground to strike lamps FL1 and FL2 through the capacitance to ground of each lamp. They are also selected to balance the ground currents through each lamp so that the high frequency sinusoidal current energizes the lamps equally. In this particular circuit, a compromise is necessary to achieve sufficient striking voltage and, thus, the ground current through lamp FLI is slightly larger than that through FL2. To correct for this imbalance, capacitor C7 is provided in shunt with lamp FL1 to provide compensating current to lamp FL2. Capacitor C8 prevents high-frequency switching noise from MOSFETS Q1 and Q2 in the switching inverter from adversely affecting the light output of lamps FL1 and FL2.

Secondary windings S1, S2, and S3 of transformer T2 provide voltage to the filaments of lamps FL1 and FL2 to heat them. Primary winding P of transformer T2 receives pulse-duration-modulated voltage from the switching inverter circuit including MOSFETS Q1 and Q2. In addition, after Q1 is turned off and before Q2 is turned on, current through Q1 and inductor L1 commutates through diode D6, turning it on. This provides across primary winding P of transformer T2 an additional pulse of voltage, having an amplitude equal to the voltage across capacitor C4. Once the voltage across capacitor C5 reaches its peak, current reverses through inductor L1, and capacitor C5 discharges, turning diode D5 on. This provides across primary winding P a second pulse of voltage, having an amplitude equal and opposite to that of the first pulse. The two additional voltage pulses substantially occupy the period of time after Q1 is turned off and before Q2 is turned on. The circuit behaves similarly during the period after Q2 is turned off and before Q1 is turned on. The resultant high-frequency voltage across primary winding P has an RMS value that is substantially constant throughout the dimming range of the lamps. Thus, secondary windings S1, S2, and S3 also provide constant RMS voltage to heat the filaments of lamps FL1 and FL2 throughout the dimming range.

Although the present invention is described for use with compact fluorescent lamps, the circuit herein described may be used to control any type of gas discharge lamp. Since certain changes may be made in the above described circuit without departing from the scope of the invention herein involved, it is intended that all matter contained in the above description or shown in the accompanying drawings shall be interpreted in an illustrative and not a limiting sense.

We claim

1. A control system for providing electrical power from a source to a gas discharge lamp, comprising:
   (a) means for providing symmetrical ac current to the electrodes of said lamp to strike and maintain an electric discharge therethrough; and
   (b) means for simultaneously providing dc current to said lamp electrodes;
   whereby an asymmetric current waveform is established in the lamp, substantially eliminating the occurrence of visible striations.

2. The control system of claim 1 wherein said ac current providing means comprises a resonant circuit including an inductor and a capacitor connected in series.

3. The control system of claim 2 wherein said ac current providing means further comprises a switching inverter, including at least one semiconductor switch, to drive said resonant circuit.

4. The control system of claim 3 wherein said semiconductor switch comprises a MOSFET.

5. The control system of claim 2 wherein said ac current providing means further comprises a transformer connected between said resonant circuit and said lamp.

6. The control system of claim 1 wherein said ac current is approximately between 20 kHz and 50 kHz.

7. The control system of claim 1 wherein said dc current providing means comprises a dc current source connected in parallel with said ac current providing means.

8. The control system of claim 1 wherein said dc current providing means comprises a rectifying circuit for rectifying a predetermined portion of said ac current.

9. The control system of claim 1 wherein said dc current is between about 0.04 and 0.7 mA at minimum lamp power and between about 0.1 and 1.4 mA at about half maximum lamp power.

10. The control system of claim 1 wherein said dc current approximately comprises between 0.02% and 0.35% of the resultant current through said lamp at maximum lamp power and approximately between 5% and 50% of the resultant current through said lamp at minimum lamp power.

11. The control system of claim 1 wherein said ac current providing means comprises a transformer, including two secondary windings connected in series with each other and said lamp; and said dc current providing means comprises a capacitor electrically connected between said secondary windings and a first resistor and a diode connected in series across one of said secondary windings.

12. The control system of claim 11 wherein said dc current providing means further comprises a second resistor connected in parallel with said capacitor.

13. A control system for providing electrical power from a source to a pair of gas discharge lamps connected in series, comprising:
   (a) means for providing symmetrical ac current to the electrodes of said lamps to strike and maintain an electric discharge therethrough; and
   (b) means for simultaneously providing dc current to said lamp electrodes;
   whereby an asymmetric current waveform is established in the lamps, substantially eliminating the occurrence of visible striations.

14. The control system of claim 13 wherein said ac current providing means comprises a resonant circuit including an inductor and a capacitor connected in series.

15. The control system of claim 14 wherein said ac current providing means further comprises a transformer, having a primary winding and two secondary windings, connected between said resonant circuit and said lamp.

16. The control system of claim 15 wherein said secondary windings are connected in series with each other and said lamps, and the connecting point between said secondary windings is connected to earth ground.

17. The control system of claim 16 wherein the relative number of turns on each of said secondary windings is selected to provide substantially equal currents to ground through each of said lamps.

18. The control system of claim 13 further comprising a capacitor connected in parallel with one of said lamps to provide substantially equal current flow to ground through each of said lamps.

19. The control system of claim 13 wherein said ac current is approximately between 20 kHz and 50 kHz.

20. The control system of claim 13 wherein said dc current providing means comprises a dc current source connected in parallel with said ac current providing means.

21. The control system of claim 13 wherein said dc current approximately comprises between 0.02% and 0.35% of the resultant current through said lamps at maximum lamp power and approximately between 5% and 50% of the resultant current through said lamp at minimum lamp power.

22. The control system of claim 13 wherein said ac current providing means comprises a transformer, including two secondary windings connected in series with each other and said lamps; and said dc current providing means comprises a capacitor connected between said secondary windings and a first resistor and a diode connected in series across one of said secondary windings.

23. The control system of claim 22 wherein the relative number of turns on each of said secondary windings is selected to provide substantially equal currents to ground through each of said lamps.

* * * * *

REEXAMINATION CERTIFICATE (3026th)

United States Patent [19]

Sullivan et al.

[11] B1 5,001,386

[45] Certificate Issued Oct. 15, 1996

[54] CIRCUIT FOR DIMMING GAS DISCHARGE LAMPS WITHOUT INTRODUCING STRIATIONS

[75] Inventors: Charles R. Sullivan, Coopersburg; Scott R. Jurell, Hellertown; David G. Luchaco, Macungie, all of Pa.

[73] Assignee: Lutron Electronics Co., Inc., Coopersburg, Pa.

Reexamination Request:
No. 90/004,060, Dec. 21, 1995

Reexamination Certificate for:
Patent No.: 5,001,386
Issued: Mar. 19, 1991
Appl. No.: 455,644
Filed: Dec. 22, 1989

[51] Int. Cl.[6] .................. H05B 41/29; H05B 41/392
[52] U.S. Cl. .................. 315/219; 315/166; 315/171; 315/307; 315/DIG. 4
[58] Field of Search .................. 315/166, 171, 315/176, 200 R, 201, 219, 223, 224, 257, 307, DIG. 2, DIG. 5, DIG. 7

[56] References Cited

U.S. PATENT DOCUMENTS

| | | | |
|---|---|---|---|
| 3,890,540 | 6/1975 | Ott | 315/257 X |
| 4,383,202 | 5/1983 | Beck et al. | 315/200 |
| 4,682,082 | 7/1987 | MacAskill et al. | 315/219 |
| 5,055,742 | 10/1991 | Jurell et al. | 315/94 |
| 5,066,894 | 11/1991 | Klier | 315/224 |
| 5,113,085 | 5/1992 | Schäfer et al. | 307/239 |
| 5,144,205 | 9/1992 | Motto et al. | 315/244 |

FOREIGN PATENT DOCUMENTS

| | | |
|---|---|---|
| 0336642A1 | 10/1989 | European Pat. Off. |
| 0390285A2 | 10/1990 | European Pat. Off. |
| 0415490A2 | 3/1991 | European Pat. Off. |
| 0422255A1 | 4/1991 | European Pat. Off. |
| 543136 | 11/1941 | United Kingdom |
| 1202505 | 8/1970 | United Kingdom |
| 1358829 | 7/1974 | United Kingdom |
| 1487584 | 10/1977 | United Kingdom |
| 2001811 | 2/1979 | United Kingdom |
| 2119184 | 11/1983 | United Kingdom |
| 2232543 | 12/1990 | United Kingdom |
| WO89/12377 | 12/1989 | WIPO |
| WO90/14746 | 11/1990 | WIPO |

*Primary Examiner*—David Mis

[57] ABSTRACT

A dimming circuit provides power from an ac source to a compact fluorescent lamp. The circuit generally includes a resonant circuit driven by a high-frequency switching inverter. The resonant circuit is essentially an ac current source and provides sinusoidal current to the lamp, which loads the resonant circuit in parallel. A small amount of dc current is simutaneously provided to the lamp. The resultant asymmetric current waveform flowing through the lamp substantially eliminates striation over a dimming range from about 100% to 1% of full light output.

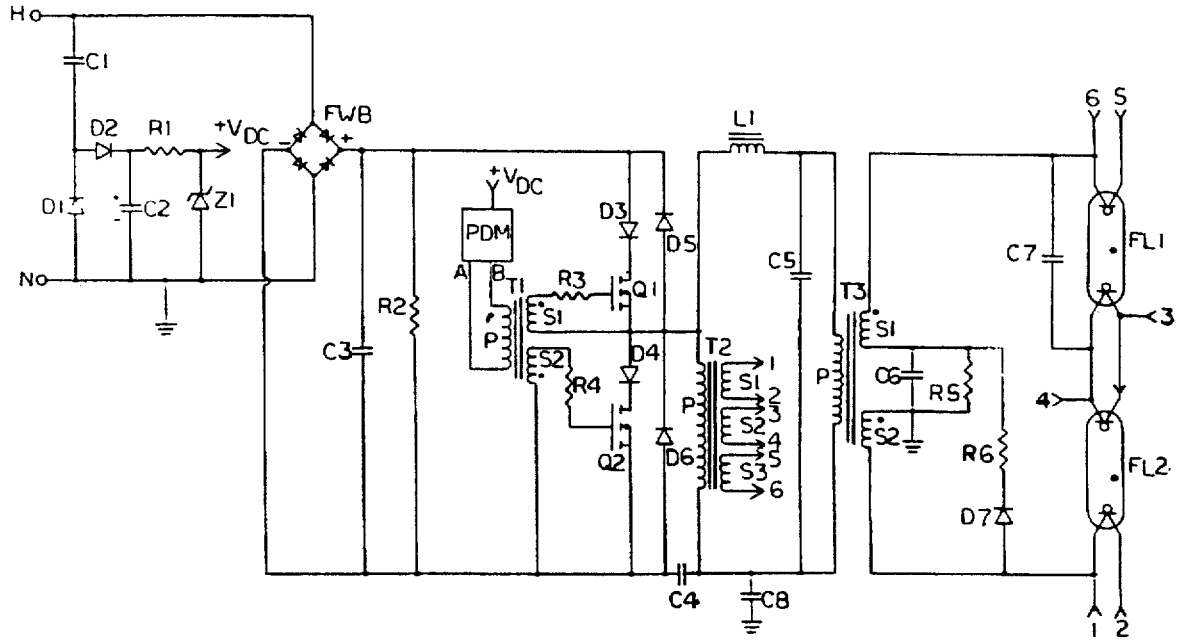

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10 and 21 are cancelled.

Claims 1 and 13 are determined to be patentable as amended.

Claims 2–9, 11, 12, 14–20, 22 and 23 dependent on an amended claim, are determined to be patentable.

1. A control system for providing electrical power from a source to a gas discharge lamp, *the gas discharge lamp having a lamp power variable between a maximum and a minimum, the control system* comprising:
    a) means for providing symmetrical ac current to the electrodes of said lamp to strike and maintain an electric discharge therethrough; and
    b) means for simultaneously providing dc current to said lamp electrodes; whereby an asymmetric current waveform is established in the lamp, substantially eliminating the occurrence of visible striations, *said dc current comprising approximately between 0.02% and 0.35% of the resultant current through said lamp at maximum lamp power and approximately between 5% and 50% of the resultant current through said lamp at minimum lamp power.*

13. A control system for providing electrical power from a source to a pair of gas discharge lamps connected in series, *each of said discharge lamps having a lamp power variable between a maximum and a minimum, the control system* comprising:
    a) means for providing symmetrical ac current to the electrodes of said lamps to strike and maintain an electric discharge therethrough; and
    b) means for simultaneously providing dc current to said lamp electrodes; whereby an asymmetric current waveform is established in the lamps, substantially eliminating the occurrence of visible striations, *said dc current comprising approximately between 0.02% and 0.35% of the resultant current through said lamp at maximum lamp power and approximately between 5% and 50% of the resultant current through said lamp at minimum lamp power.*

* * * * *